(12) United States Patent
Pierson et al.

(10) Patent No.: US 8,598,857 B2
(45) Date of Patent: *Dec. 3, 2013

(54) METHODS AND APPARATUS FOR A MULTIPHASE POWER REGULATOR

(75) Inventors: Richard Pierson, Newport Beach, CA (US); Scott Southwell, Seal Beach, CA (US); Benjamim Tang, Rancho Palos Verdes, CA (US); Timothy M. Ng, Monterey Park, CA (US); Jinghong Guo, Torrance, CA (US); Kenneth A. Ostrom, Palos Verdes Estates, CA (US)

(73) Assignee: Infineon Technologies Austria AG, Villach (AT)

( * ) Notice: Subject to any disclaimer, the term of this patent is extended or adjusted under 35 U.S.C. 154(b) by 655 days.

This patent is subject to a terminal disclaimer.

(21) Appl. No.: 12/333,003

(22) Filed: Dec. 11, 2008

(65) Prior Publication Data

US 2009/0121695 A1   May 14, 2009

Related U.S. Application Data

(63) Continuation-in-part of application No. 11/311,115, filed on Dec. 19, 2005, now Pat. No. 7,521,913.

(60) Provisional application No. 61/012,900, filed on Dec. 11, 2007.

(51) Int. Cl.
    *G05F 1/575* (2006.01)
(52) U.S. Cl.
    USPC ............................. 323/283; 323/272; 323/284
(58) Field of Classification Search
    USPC .................. 323/283, 284, 272; 341/159, 142; 363/65
    See application file for complete search history.

(56) References Cited

U.S. PATENT DOCUMENTS

| | | | |
|---|---|---|---|
| 5,568,044 A | 10/1996 | Bittner | |
| 5,793,628 A | 8/1998 | Koch | |
| 6,495,995 B2 * | 12/2002 | Groom et al. | 323/283 |
| 6,512,353 B2 | 1/2003 | Sanzo et al. | |
| 6,577,109 B2 | 6/2003 | Dancy et al. | |
| 6,605,931 B2 | 8/2003 | Brooks | |
| 6,628,106 B1 | 9/2003 | Batarseh et al. | |
| 6,795,009 B2 | 9/2004 | Duffy et al. | |
| 6,798,180 B2 * | 9/2004 | Hayashi et al. | 323/282 |
| 6,965,502 B2 | 11/2005 | Duffy et al. | |
| 7,109,689 B2 * | 9/2006 | Schneider | 323/272 |
| 7,233,132 B1 | 6/2007 | Dong et al. | |
| 7,239,116 B2 | 7/2007 | Tang | |
| 2002/0171985 A1 * | 11/2002 | Duffy et al. | 361/90 |
| 2003/0006650 A1 | 1/2003 | Tang et al. | |

(Continued)

OTHER PUBLICATIONS

"Power topics for power supply users: over current protection in power supplies and converters," http://power-topics.blogspot.com/2008/09/over-current-protection-in-power.html, Nov. 20, 2008.

*Primary Examiner* — Harry Behm
(74) *Attorney, Agent, or Firm* — Murphy, Bilak & Homiller, PLLC

(57) ABSTRACT

Methods and apparatus for a multiphase power regulator according various aspects of the present invention operate in conjunction with an active transient response (ATR) system for applying a correction signal to a multiphase pulse width modulator. In the event of a transient, the ATR system may adjust the output of the pulse width modulator to quickly respond to load requirements. The output may be modified by adding pulses, blanking pulses, advancing pulses, and scaling pulses to one or more phases.

11 Claims, 4 Drawing Sheets

(56) References Cited

U.S. PATENT DOCUMENTS

2004/0095104 A1* 5/2004 Brooks ................ 323/272
2004/0150928 A1 8/2004 Goodfellow et al.
2004/0196019 A1* 10/2004 Schneider ............ 323/285
2006/0132110 A1 6/2006 Tang et al.
2006/0152205 A1 7/2006 Tang et al.
2008/0266738 A1 10/2008 Kimber

* cited by examiner

METHODS AND APPARATUS FOR A MULTIPHASE POWER REGULATOR

CROSS-REFERENCES TO RELATED APPLICATIONS

This application includes subject matter that is related to the following patents and applications, commonly assigned to the assignee of the present application:

1. ACTIVE TRANSIENT RESPONSE CIRCUITS, SYSTEM AND METHOD FOR DIGITAL MULTIPHASE PULSE WIDTH MODULATED REGULATORS, Ser. No. 11/311,115, filed Dec. 19, 2005, inventors: Tang, et al.

2. SYSTEM, DEVICE AND METHOD FOR PROVIDING VOLTAGE REGULATION TO A MICROELECTRONIC DEVICE, Ser. No. 10/103,980, filed Mar. 22, 2002, inventors: Duffy, et al., now U.S. Pat. No. 6,965,502.

3. FINE RESOLUTION PULSE WIDTH MODULATION PULSE GENERATOR FOR USE IN A MULTIPHASE PULSE WIDTH MODULATED VOLTAGE REGULATOR, Ser. No. 11/112,707, filed Apr. 23, 2005, inventor: Tang, now U.S. Pat. No. 7,239,116.

This application claims the benefit of U.S. Provisional Patent Application No. 61/012,900, filed Dec. 11, 2007, and is a continuation-in-part of U.S. patent application Ser. No. 11/311,115, filed Dec. 19, 2005.

All of the foregoing are hereby incorporated by reference.

BACKGROUND OF THE INVENTION

Microelectronic devices typically require switching power supplies, which are designed to deliver power from a primary source to an electrical load at a specified current, voltage, and power efficiency. Switching power supplies are useful due to the small area and volume they occupy. They are also known for high efficiency, high current capability, and topological flexibility. Switching power supplies can employ many topologies, such as buck, boost, buck-boost, forward, flyback, half-bridge, full-bridge, and SEPIC. In particular, multiphase buck converters are well suited to supply power at low voltage and high current, while maintaining accurate voltage. Typically, buck converters comprise active components, such as a pulse width modulation (PWM) controller integrated circuit, driver circuits, power MOSFETs, and passive components, such as inductors, capacitors, and resistors. With the advent of increasingly complex power regulation topologies, digital techniques for power converter control, specifically in multiphase designs, can improve precision and reduce the system's total parts count while also supporting multiple applications in the same power system through digitally programmable feedback control.

Power requirements for emerging leading edge technology, however, have become very difficult to satisfy. As the speed and integration of electronic components increases, the demands on the power regulation system increase. For example, as gate counts increase, the power regulation current demand increases, the operating voltage decreases, and transient events (e.g. relatively large voltage and/or current spikes or droops at the load) typically increase in both magnitude and frequency. Some emerging microprocessors are expected to run on less than 1.0 volts and more than 150 amperes.

SUMMARY OF THE INVENTION

Methods and apparatus for a multiphase power regulator according various aspects of the present invention operate in conjunction with an active transient response (ATR) system for applying a correction signal to a multiphase pulse width modulator. In the event of a transient, the ATR system may adjust the output of the pulse width modulator to quickly respond to load requirements. For example, the output may be modified by adding pulses, blanking pulses, advancing pulses, and scaling pulses to one or more phases.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

Figure 1:
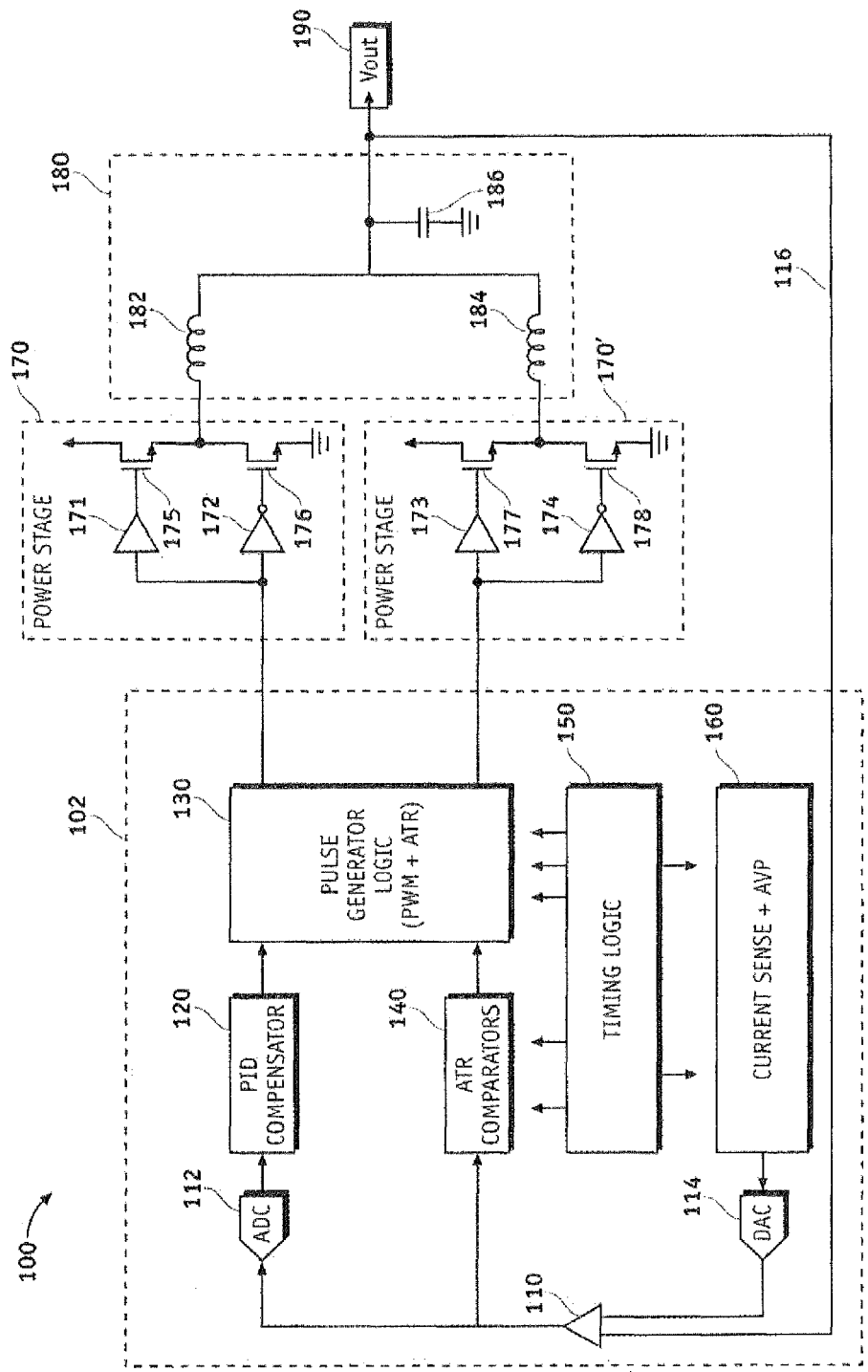
FIG. 1 is a block diagram of a power supply with active transient response according to various aspects of the present invention.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DETAILED DESCRIPTION OF EXEMPLARY EMBODIMENTS

The present invention may be described in terms of functional block components and various processing steps. Such functional blocks may be realized by any number of hardware or software components configured to perform the specified functions and achieve the various results. For example, the present invention may employ various integrated components and electronic devices that may be implemented in any appropriate manner, such as integrated circuits, logic arrays, processors, transistors, resistors, capacitors, inductors, and the like. In addition, the present invention may be practiced in conjunction with any number of converter and/or regulator applications, and the systems described are merely exemplary applications for the invention. Further, the present invention may employ any number of conventional techniques for regulating power, modifying a waveform, driving a voltage switch, controlling a driver, filtering a signal, and the like.

Various representative implementations of the present invention may be implemented in conjunction with a power supply. The power supply may comprise, for example, a converter using step-down, step-up, buck, boost, buck-boost, forward, flyback, half-bridge, full-bridge, and/or SEPIC topologies. For example, referring to FIG. 1, a power regulator 100 according to various aspects of the present invention may comprise a multiphase buck converter including a pulse generator 130, a power stage 170, and a filter 180. Generally, the pulse generator 130 provides a control signal to the power stage 170 to control the output of the power stage 170. The power stage 170 responds to the control signal to maintain, increase, or decrease the output voltage and/or current provided to a load 190. The filter 180 smoothes the output signal to supply a relatively level output voltage. The pulse generator 130 may respond to inputs from various sources, such as a PID compensator 120, as well as an active transient response (ATR) system comprising an ATR comparator circuit 140 and ATR control system 210 (FIG. 2) and/or a timing logic circuit and various sensors 150.

The switching power supply 100 may be adapted for high power applications, such as providing high current at low voltages, for example for supplying high-performance integrated circuits such as microprocessors, graphics processors, and network processors. The switching power supply 100 may be adapted to be placed as close as possible to the load to minimize board trace losses, for example in a distributed power supply system referred to as "point-of-load". The switching power supply 100 may also be optimized for high efficiency and small area and volume requirements.

For example, the components can be integrated, partially integrated (e.g., just the drivers and switches), or discrete. In the present embodiment, the switching power supply 100 comprises an integrated power stage 170 configured for high current applications, such as about 100-200 amperes. The integrated power stage 170 may either fully integrate all components, or partially integrate a few components. For example, integrating a driver circuit and a switch circuit of the power stage 170 may significantly reduce or eliminate parasitic capacitances and inductances associated with the swing, input voltage, ground, and switch gates compared to a discrete design.

The power stage 170 supplies power according to the control signal from the pulse generator 130. The power stage 170 is directly or indirectly connected to the pulse generator 130 and the filter 180 such that the power stage 170 responds to the control signal from the pulse generator 130 to control the output provided to the load 190 via the filter 180. In the present embodiment, the power stage 170 includes multiple inputs connected to the controller to receive the control signal for multiple phases and multiple outputs connected to the filter 180.

The power stage 170 may comprise any circuit or other system for providing power according to the control signal, such as an amplifier or converter. In the present embodiment, the power stage 170 comprises a step-down converter or other system for converting an input voltage into an output voltage. The present step-down converter increases average output voltage in response to a longer duty cycle of the control signal, and conversely decreases average output voltage in response to a shorter duty cycle. For example, referring again to FIG. 1, a phase of the power stage 170 may comprise one or more switches 175, 176 and one or more driver circuits 171, 172. In addition, the power stage 170 may utilize additional phases, e.g. power stage 170'. The additional phase of the power stage 170' may comprise one or more switches 177, 178 and one or more driver circuits 173, 174. Each power stage may include a control switch, a synchronous switch, and a driver, or may include multiple switches and drivers. The switches 175, 176 alternately supply higher and lower signals to the filter 180. The driver circuits 171, 172 control the switches 175, 176 according to the control signal.

Figure 2:
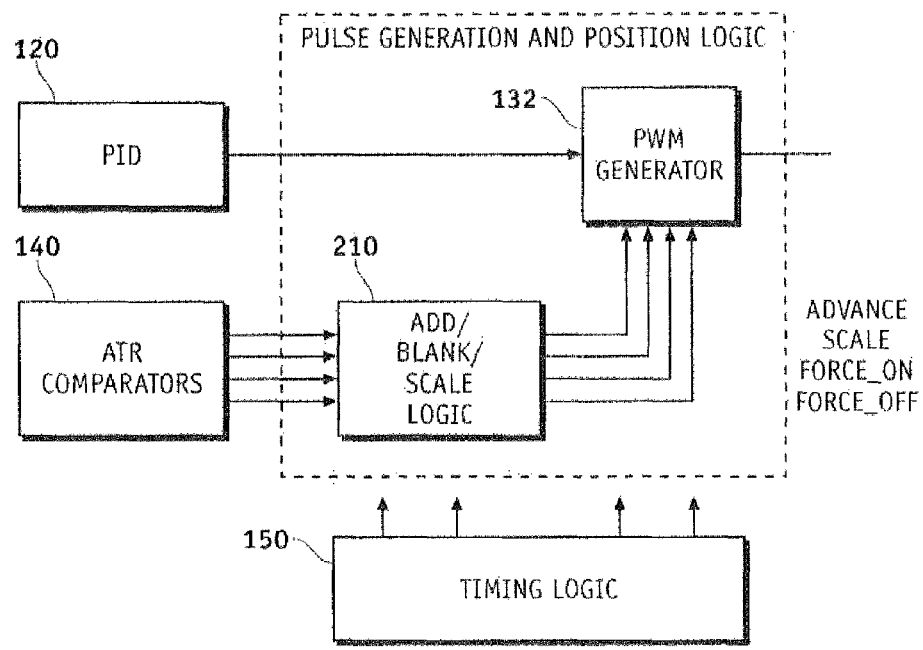
FIG. 2 is a block diagram of a control system with pulse width modulation and active transient response with pulse generation and position logic.

The power stage 170 may comprise any appropriate number of switches 175, 176 and driver circuits 171, 172. Although FIG. 1 illustrates power stage 170 having two phases, each including two driver circuits and two switches, the power stage 170 may include any suitable number of phases. Additional phases may comprise similar structures. The phase 1 output from the pulse generator 130 may be provided to the driver circuits 171, 172, and the phase 2 output of pulse generator 130 may be provided to driver circuits 173, 174. In phase 1, driver circuit 171 drives the gate of FET 175 and driver circuit 172 drives the gate of FET 176. In phase 2, driver circuit 173 drives the gate of FET 177 and driver circuit 174 drives the gate of FET 178. Although two phases are shown, any number of phases can be used. More phases tend to provide smoother and more accurate power to the load.

The various components may be placed on an integrated circuit chip in any manner. For example, the hotter-running components may be placed towards the edge of the chip. Integrating the drivers and the switches on the chip allows for all signals to be internal to the chip and the drivers and output devices may be segmented so as to avoid increasing the total area requirement and have individual control over each segment. Also, the integration may significantly reduce or eliminate parasitic capacitance and inductances. The power stage 170 may, however, be implemented in any suitable manner to allow it to receive the signal from the pulse generator 130 and output a voltage based on that signal.

The driver circuits 171-174 control the corresponding switch circuits 175-178 according to the control signals from the pulse generator 130. For example, if the control signals indicate that the output voltage should be increased, the driver circuit 171 may activate the high-side switch 175 and the driver circuit 172 may deactivate the low-side switch 175 to increase the output voltage of the power stage 170. Conversely, if the control signal indicates that the output voltage should be decreased, the driver circuit 171 deactivates the high-side switch 175 and the driver circuit 172 activates the low-side circuit 176 to decrease the output voltage of the power stage 170.

The driver circuit 171 may comprise any system for providing a signal to an electrical switch and relaying the signal to other components, such as a logic gate, CMOS gate, amplifier, transistor, electromagnetic relay, and the like. The driver circuit 171 may be implemented with any combination of logic or components. The driver circuit 171 may be configured to provide appropriate voltage and/or current to control the switch circuit 175, such as conventional driver circuits for controlling power MOSFETs in a conventional buck converter.

The switch circuits 175, 176 perform the step-down function for the power supply by alternately connecting two voltages, for example an input voltage and a ground or reference level, to the output of the power stage 170. The switch circuits 175, 176 are respectively connected to the input voltage and ground, and periodically alternately connect the output of the power stage 170 to the input voltage and to ground according to the signals from the driver circuits 171, 172. The switch circuits 175, 176 may comprise any suitable systems for controlling the voltage and/or current supplied to the output, such as a physical switch, latch, relay, transistor, diode, amplifier, or the like. In the present embodiment, the switch circuits are fully switched so that the circuits are substantially either fully on or fully off. Each switch 175, 176 may comprise a conventional switch for a buck converter, such as a power MOSFET.

The filter 180 smoothes the output of the power stage 170. The filter 180 may comprise any appropriate system for smoothing the power stage 170 output, such as an analog or digital filter, and may comprise any device or combination of devices for regulating a voltage, such as capacitors, resistors, inductors, integrated circuits, and the like. In an exemplary embodiment, referring to FIG. 1, the filter 180 comprises output inductor 182, 184 for each phase and an output capacitor 186. In operation, during phase 1, while the pulse width modulated waveform turns the high-side switch 170 on, current flows through the high-side switch 170 and through the inductor 182 to charge capacitor 186 and provide power to the load 190. Conversely, when the low-side switch 176 is turned on, current flows through the low-side switch 176. The second phase high-side switch 177 and low-side switch 178 operate in a similar manner during phase 2. In a multi-phase system having more than 2 phases, additional phases are connected in a similar manner.

The control system 102 drives the power stage 170 to supply power to the load 190. The control system 102 may control the power delivered according to any appropriate algorithms, criteria, and/or inputs. In the present embodiment, the control system 102 controls the voltage applied to the load 190 to substantially maintain a desired voltage. The control system 102 may also control the power delivery according to other criteria, such as to prevent, inhibit, and/or correct over-voltage, under-voltage, over-current, and under-current conditions at the load or in the power supply 100. In the present embodiment, the control system 102 receives input from various sources, such as a feedback voltage signal 116 and signals from one or more current sensors 180. For example, the current sensors may sense current provided to the load 190 and/or through the various phases, such as through the filter inductors 182, 184 or high-side switches 175, 177. The control system 102 may also include timing logic 150, such as clock generators, interpolators, and/or the like. The control system 102 may also receive adaptive voltage positioning (AVP) information to more accurately control the power delivered to the load 190. In addition, the control system 102 may include the ATR system comprising the ATR comparator circuit 140 and ATR control system 210 for identifying and responding to transient events.

Target operating parameters may be established according to any suitable criteria, such as based on static values or dynamic adjustment according to load or supply characteristics. For example, the AVP circuit 160 may provide target values and thresholds to define over-voltage, under-voltage, over-current, and under-current conditions, as well as different levels of such conditions. Compensating for transients causing over-voltage and under-voltage conditions may be enhanced by adjusting the target voltage and voltage thresholds to a specified load line. The AVP circuit may establish target values and thresholds according to amplitudes of load voltage, load current, and the slope of the AVP load line as specified by the manufacturer of the load. Loads requiring precisely controlled low voltage levels at high currents under rapidly changing load conditions include microprocessors, microcontrollers, and the like. The specified error limits may be provided by the manufacturer of the load. Under normal operating conditions, the voltage and current provided to the load are expected to stay within the specified error limits, for example +/−19 millivolts.

By using AVP as a reference "target voltage", the control system 102 may correct under-voltage and over-voltage excursions accordingly. The target voltages may be used as references for correcting for under-voltage and over-voltage conditions, combined with the multilevel sensing and multi-gain correction to respond to transient excursions. Various aspects and details of AVP circuits are disclosed and described, for example, in U.S. Patent Publication No. 2006/0152205 published Jul. 13, 2006, by Tang, et al.

In the present embodiment, voltage control is provided by the AVP circuit 160. The AVP circuit 160 may perform voltage control according to load characteristics, such as according to a VID input and an RLOADLINE input, which is a number provided by microprocessor manufacturers indicating the desired slope of the load line. The AVP circuit 160 may also receive data corresponding to current from all the phases of the power stage 170, which may facilitate providing an adjustment to the target voltage. Thus, the target voltage is determined by the AVP circuit 160, which adjusts the target voltage in accordance with the specified load line. In addition, the AVP circuit 160 may receive inputs from the ATR circuit 140 for providing early and predictive correction of the target voltage.

The compensator 120 utilizes feedback control signals to generate an output signal, such as a binary number, that is representative of the desired duty cycle. The compensator 120 may comprise any appropriate compensator to generate the output signal, such as a conventional PID compensator for use in a power supply. In an exemplary embodiment of the present invention, the compensator 120 receives a signal from a differential amplifier 110, which receives the voltage signal from the load and the target voltage from the AVP circuit 160, for example via a digital-to-analog converter (DAC) 114. The signal from the differential amplifier 110 is the error voltage corresponding to the difference between the sensed voltage and target voltage.

The compensator 120 transfer function is computed in such a way as to provide stable closed loop operation of the power supply 100, while maximizing the performance such as bandwidth of the loop. The compensator 120 adjusts the width of the output pulse, increasing or decreasing the load voltage to drive the error voltage to zero, thus regulating the voltage at the load 190. In the present embodiment, the compensator 120 output is a digital representation of the desired pulse width. This output may be scaled (i.e. multiplied) by a multiplier constant to generate a value that is used by the pulse generator 130 to generate a pulse of the desired width for that cycle.

The compensator 120 is configured to, among other things, ensure stable operation of the power supply 100 with a substantially small steady state ripple and fast transient response. The compensator 120 may, for example, utilize digital delay, gain and summing stages. These stages may provide the control operation, and thus eliminate the need for various amplifiers, resistors and capacitors used in analog systems. Furthermore, the compensator 120 may comprise any suitable component that is the digital equivalent of an analog transfer function or implementation used to stabilize or control a switching power supply. Various aspects and details of compensators are disclosed and described, for example, in U.S. Pat. No. 6,965,502, issued Nov. 15, 2005, to Duffy, et al.

The pulse generator 130 controls the power stage 170 to regulate the output, such as the voltage, current, and/or frequency. The pulse generator 130 may comprise any appropriate system and operate in any suitable manner to control the power stage 170, such as a feedback amplifier and/or pulse width modulation (PWM) controller. For example, the pulse generator 130 may sense an output voltage, such as via a feedback loop, and compare the output voltage to a reference voltage. The pulse generator 130 may then adjust the power stage 170 to maintain or change an output voltage of the power stage 170. In the present embodiment, the pulse generator 130 comprises a PWM controller. The pulse generator 130 is coupled to the power stage 170 through multiple driver circuits 171, 172, 173, 174. The pulse generator 130 controls the power stage 170 by varying the duty cycle of the control signals provided to the power stage 170.

In addition, the pulse generator 130 may generate any appropriate control signals to control the power stage 170 and generate the desired power supply 100 output. For example, the pulse generator 130 may adjust the pulse generation and pulse positioning of the control signals to respond to voltage excursions more precisely. For example, referring to FIG. 2, the pulse generator 130 may comprise a PWM generator 132 and the ATR control system 210. The PWM generator 132 may generate the control signals for the power stage 170 according to conventional power regulation processes. The ATR control system 210 may interrupt the normal operation of and otherwise control the PWM generator 132 to adjust the control signal, such as to generate additional asynchronous pulses, scale existing pulses, generate scaled pulses, or blank pulses for one or more phases in response to transient events.

The PWM generator 132 may control the control signal according to any suitable criteria and variables. For example, the PWM generator 132 may receive the control signal inputs from the compensator 120 and the ATR control system 210. The PWM generator 132 may also receive signals from other sources, such as voltage and current sensors, external ATR circuits, or other systems. The PWM generator 132 may control the power stage 170 according to the inputs and selected criteria to control the power supply 100 output.

In the present embodiment, the output of the compensator 120 may be scaled (i.e. multiplied) by a multiplier constant to generate a value that is used by the PWM generator 132 to generate a pulse of the desired width for that cycle. The PWM generator 132 may use a counter to generate a desired pulse width. The counter runs off a higher frequency clock such that the output pulse widths are integral multiples of the high frequency period (or half period if both edges of the clock are used by the counter). The present PWM generator 132 provides for high resolution and high precision pulse width control, allowing improved performance in digital multiphase voltage regulators. For example, the present PWM generator may comprise a fine resolution PWM pulse generator as disclosed and described in detail in U.S. Pat. No. 7,239,116, issued Jul. 3, 2007 to Tang.

The present PWM generator 132 may comprise an interpolator that receives the least significant bits (LSBs) from the duty cycle and coarse pulse widths, and generates the final fine pulse width by interpolating among the edges of the coarse pulse width and delayed replicas of the coarse pulse width CPW. The PWM generator 132 may interpolate the leading edges and/or the trailing edges of the coarse pulses, which facilitates advancing pulses, scaling pulse widths, and insertion and deletion of pulses in the various phases.

The PWM generator 132 may also respond to signals from the ATR system comprising the ATR control system 210 and the ATR comparator circuit 140. The ATR control system 210 receives signals from the ATR comparator circuit 140 and adjusts the output of the PWM generator 132 to respond to detected transient events. The transient events may be detected in any appropriate manner, such as by the ATR comparator circuit 140.

The ATR comparator circuit 140 detects transient events and generates corresponding signals to facilitate preventing, inhibiting, and/or responding to transient events. The ATR comparator circuit 140 may receive signals indicating transient activity and drive the pulse adjustment system to quickly respond to transient activity. The ATR comparator circuit 140 may be configured for rapidly detecting of transients, assisting in transient suppression, and/or early signaling of transient activity to the power supply 100. Multiple ATRH thresholds may improve circuit operation, such that the pulse generator 130 may adjust the magnitude of the ATR response according to the magnitude of the excursion indicated by the signal from the ATR comparator circuit 140. The ATR comparator circuit 140 may comprise any suitable ATR circuit, such as an internal and/or an external ATR circuit.

In one embodiment, the ATR comparator circuit 140 may be coupled between the power supply 100 output, such as at the load 190, and the pulse generator 130. The ATR comparator circuit 140 may detect the voltage level at the load and compare the voltage level to one or more target values. In the present embodiment, the ATR comparator circuit 140 receives the target voltage error signal from the differential amplifier 110 and compares it to one or more thresholds, such as thresholds selected according to the AVP circuit 160. In the event that the transient voltage at the load 190 deviates from the target voltage by one or more of the pre-set thresholds, ATR 140 provides a corresponding signal to the ATR control system 210 that is a function of the amplitude of the deviation of the detected voltage from the target voltage.

As long as the voltage at the load is maintained within predetermined limits, the ATR comparator circuit 140 is not activated and no output signals are provided by the ATR comparator circuit 140. When changes in power demands by the load 190 result in a voltage excursion at the load that exceeds the predetermined limits, the ATR comparator circuit 140 provides signals corresponding to the magnitude and direction of the excursion. For example, the ATR comparator circuit 140 may generate an ATRL signal when the transient event exceeds an upper threshold, and an ATRH1, ATRH2, or ATRH3 signals when the transient event drops the voltage below a first, second, or third lower threshold. The ATR signals may be provided to the ATR control system 210 to correct the voltage deviation rapidly and with minimal noise generation. Various aspects and details of ATR circuits are disclosed and described, for example, in U.S. Pat. No. 6,965,502, issued Nov. 15, 2005, to Duffy, et al., and U.S. Patent Publication No. 2006/0152205 published Jul. 13, 2006, by Tang, et al.

The ATR comparator circuit 140 may also be coupled between AVP circuit 160 and pulse generator 130 to receive signals corresponding to an ATR event from the AVP circuit 160. This enables the ATR comparator circuit 140 to receive early, predictive changes from the AVP circuit 160. This predictive change can occur prior to the time that the sensed current change is received from ADC 112 because the sensed load current change may be delayed by the inductor 182 and/or other components.

For example, the AVP circuit 160 may be configured to receive and/or generate pre-determined current and/or voltage values representing different threshold levels of an active transient response event. The AVP circuit 160 may receive these predetermined current values, for example from memory, and provide them as an output when receiving a signal indicative of an ATRH event. The particular current and/or voltage value provided at the output may be selected according to the degree of the ATRH event, i.e. ATRH1, ATRH2, or ATRH3. These pre-determined current values may be added to the compensation voltage applied to the load 190 at a time prior to the detection of current transients. This enables the AVP circuit 160 to provide an early, predictive change to the target voltage and associated thresholds. This predictive change can occur prior to the time that the sensed current change is received from the ADC 112 because the sensed load current change is delayed passing through inductors 182, 184, and other similar inductors in additional phases.

The ATR control system 210 receives the signals from the ATR comparator circuit 140 and may adjust the operation of the PWM generator 132 accordingly. The ATR control system 210 may make any appropriate adjustments according to the type of detected transient, magnitude, and any other appropriate criteria. For example, in the event of an over-voltage condition, the ATR control system 210 can activate additional low-side phases, in addition to blocking high-side pulses to maximize output current slew rate. The ATR control system 210 may be asynchronous relative to the synchronous PWM pulse generation. The ATR control system 210 may also select phases for applying correction pulses, such as in accordance with a predetermined scheduled timing relative to the synchronous pulse width modulated pulses.

The ATR control system 210 enables enhanced speed and precision for responding to transient events. The ATR control system 210 receives signals from the ATR comparator circuit 140 and provides the appropriate response to the PWM generator 132. For example, the ATR control system 210 may cause the PWM generator 132 to asynchronously add pulses, blank pulses, scale pulses, advance pulses, and the like to one or more phases. For example, the ATR control system 210 may generate logical commands to advance, scale, force on, or force off a pulse.

In the present embodiment, the ATR control system 210 may introduce one or more asynchronous pulses on one or more phases. The asynchronous pulses may be provided in addition to the "normal" synchronous pulse output. Alternatively, the ATR control system 210 may modify a normal synchronous pulse, for example by scaling or blanking it. The particular actions implemented by the ATR control system 210 may be selected according to any suitable criteria, such as the type of transient condition, the signal generated by the ATR comparator circuit 140, and/or the number of voltage thresholds that are exceeded. The ATR control system 210 advance, scale, delay, and otherwise control the pulses in conjunction with the fine resolution PWM generator 132 capabilities to precisely control the characteristics of the modified and/or added pulses.

The response to the transient event may also be selected according to the magnitude of the transient. For example, a large transient may require additional pulses on multiple phases and/or longer pulses on the various phases. In addition, the ATR control system 210 may implement pulse limiting to fix the amount of time that the additional pulses are on, then force them off for a fixed amount of time, which tends to modify the strength of the compensating action.

Figure 3:
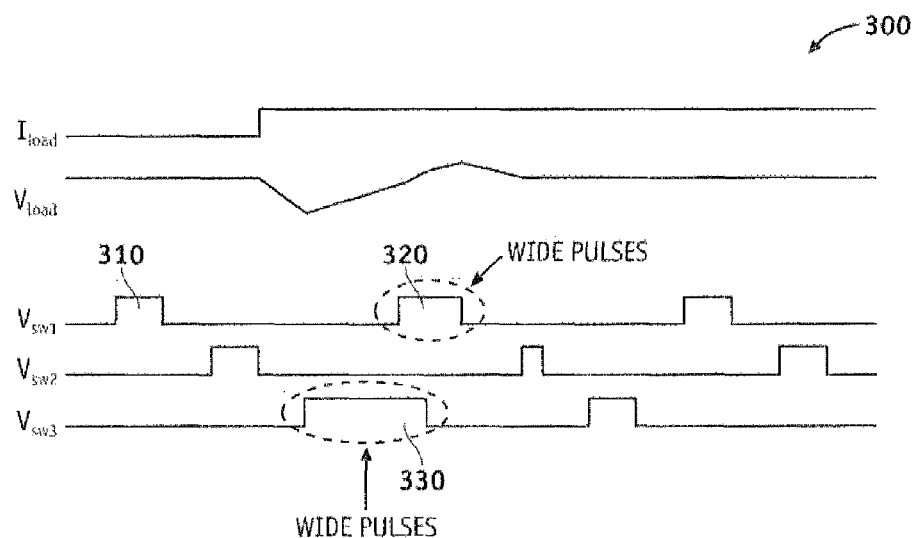
FIG. 3 illustrates a load step response resulting from a multiphase pulse width modulation.

Referring to FIG. 3, a sudden high current demand Iload may cause the voltage Vload to drop substantially. In response, the ATR system may instruct the pulse generator 130 to extend the next pulse output 330 on the third channel or phase Vsw3, as well as the next pulse output 320 on phase Vsw3. Pulse output 310 is an example of a "normal" synchronous pulse provided by the PWM generator 132.

Figure 4:
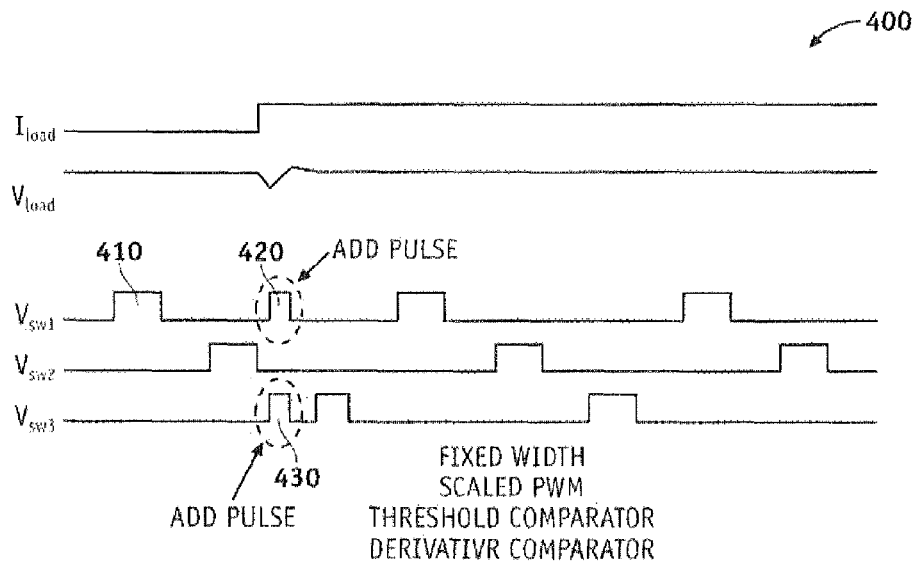
FIG. 4 illustrates a load step response resulting from a multiphase pulse width modulator with active transient response adding a pulse.

Referring now to FIG. 4, a sudden high current demand Iload causes the voltage Vload to drop substantially. In response, the ATR control system 210 may cause the PWM generator 132 to generate additional pulses 420 and 430 on channels Vsw1 and Vsw3, respectively, in response to the load change. As illustrated, these pulses 420 and 430 are added at a point in time right after the "normal" synchronous pulse of channel Vsw2 has just turned off and before the pulse of channel Vsw3 is turning on. Further, these additional pulses 420 and 430 may be scaled or fixed in duration. Thus, they are not the same width as the "normal" synchronous pulses. Pulse output 410 is an example of a "normal" synchronous pulse provided by the PWM generator 132.

Figure 5:
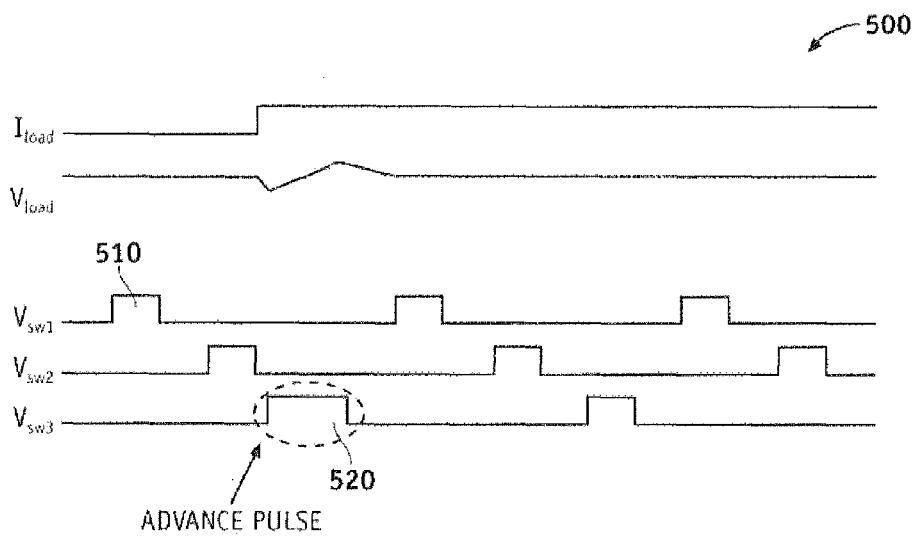
FIG. 5 illustrates a load step response resulting from a multiphase pulse width modulator with active transient response advancing a pulse.

Referring now to FIG. 5, a sudden high current demand load causes the voltage Vload to drop substantially. In response, the ATR control system 210 may cause the PWM generator 132 to advance the "normal" synchronous pulse 520 on channel Vsw3. Pulse output 510 is an example of a "normal" synchronous pulse provided by the PWM generator 132 which was not modified.

Figure 6:
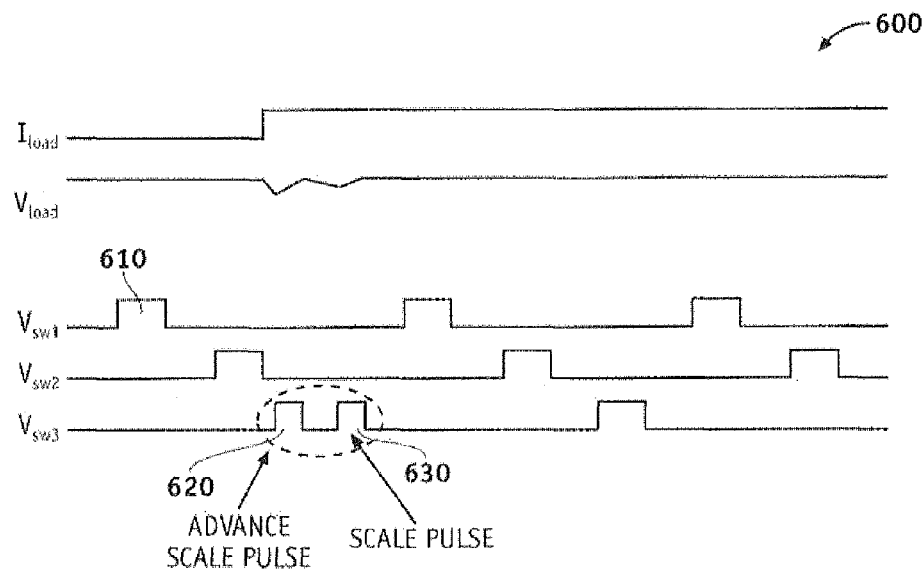
FIG. 6 illustrates a load step response resulting from a multiphase pulse width modulator with active transient response advancing a scaled pulse.

Referring now to FIG. 6, a sudden high current demand Iload causes the voltage Vload to drop substantially. In response, the ATR control system 210 may cause the PWM generator 132 to advance half of a "normal" synchronous pulse producing advance scale pulse 620 on channel Vsw3. The PWM generator 132 leaves the remaining half of the "normal" synchronous pulse, scale pulse 630, in its original location. Pulse output 610 is an example of a "normal" synchronous pulse provided by the PWM generator 132 which was not modified.

Figure 7:
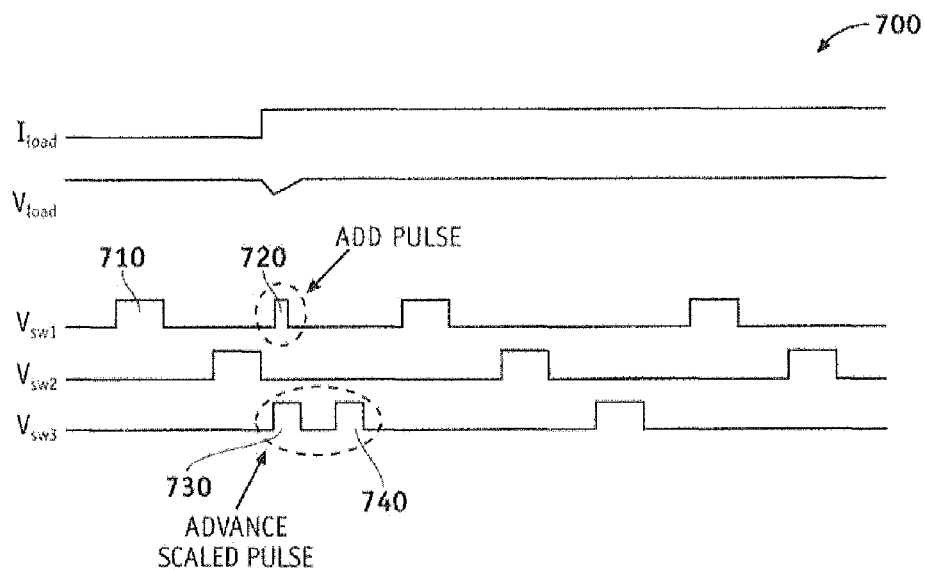
FIG. 7 illustrates a load step response resulting from a multiphase pulse width modulator with active transient response producing pulses independent of a pulse.

Referring now to FIG. 7, a sudden high current demand Iload causes the voltage Vload to drop substantially. The ATR control system 210 may cause the PWM generator 132 to add a pulse to channel Vsw1. Also, at the same time, the ATR control system 210 may cause the PWM generator 132 to advance half of a "normal" synchronous pulse, producing advance scale pulse 730 on channel Vsw3. The PWM generator 132 leaves the remaining half of the "normal" synchronous pulse, scale pulse 740, in its original location. The different responses of the two different phases demonstrate how the phases can exhibit different behavior. Thus, the phase responses are independent of each other. Pulse output 710 is an example of a "normal" synchronous pulse provided by the PWM generator 132 which was not modified.

In operation, during phase 1, while the pulse width modulated waveform turns on high side FET 175, current flows through FET 175 and through inductor 182 to charge capacitor 186 and provide power to load 190. On the other hand, when low side FET 176 is turned on, current flows through FET 176. High side FET 177 and low side FFT 178 operate in a similar manner during phase 2. The voltage from the load 190 is fed back to ADC 112 so that the voltage to the load can be adjusted to changing load conditions.

The current being supplied to the load may also be monitored, such as at the power stage 170. In particular, when the voltage excursion from the load line exceeds a predetermined specified amount, then a secondary power adjustment may be provided. Based on the magnitude of the voltage excursion, the ATR comparator circuit 140 may determine the extent to which a more rapid and more precise response is required. In the event that a response is more rapidly or more precisely than the synchronous pulse outputs regularly provided, the ATR control system 210 may adjust the signals provided by the PWM generator 132 to add, blank, scale, advance, and/or otherwise adjust the pulses. The pulse generation and positioning may comprise one or more of adding asynchronous pulse outputs, advancing pulse outputs, scaling pulse outputs, and blanking pulse outputs.

A power supply 100 according to various aspects of the present invention thus provides a multi-phase modulated voltage regulator and associated processes for detecting transient voltage excursions or deviations due to load current transients. The ATR control system 210 applies a correction signal if the excursions exceed the load line voltage by more than a predetermined amount. For example, the ATR control system 210 may generate asynchronous pulses for controlling the various phases of the power stage 170. The duration, generation, and positioning of the pulses may be selected such that the load voltage excursions are minimized, improving the transient response of the power supply 100. The generation, duration, and positioning of the pulses may be computed independently for each phase, and may be selected and adjusted according to any appropriate criteria, such as the magnitude of the voltage excursions, the instantaneous current in each phase, the output of the compensator 120 or the filter 180, and/or the relative position of the synchronous pulses scheduled by the PWM generator 132.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are, accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A power regulator having multiple phases and configured to generate an output signal for a load, comprising:
   a multiphase pulse width modulator adapted to generate synchronous pulse width modulated signals on the multiple phases; and
   an active transient response (ATR) system coupled to the multiphase pulse width modulator, wherein the ATR system is adapted to:
      identify a transient event in the output signal corresponding to load voltage excursions at the load;
      generate asynchronous pulses independently for each phase based on an instantaneous current in each phase or a relative position of the synchronous pulse width modulated signals generated by the multiphase pulse width modulator on the multiple phases, for controlling the phases of the power regulator in response to the transient event; and
      control a generation, a duration, and a position of the asynchronous pulses to minimize the load voltage excursions.

2. A power regulator according to claim 1, wherein the ATR system is adapted to identify the transient event by comparing a voltage of the output signal to a plurality of ATR thresholds.

3. A power regulator according to claim 2, wherein the ATR system is adapted to adjust the ATR thresholds according to a state of the load.

4. A power regulator according to claim 1, wherein the ATR system comprises a fine resolution pulse width modulator including an interpolator, wherein the fine resolution pulse width modulator is adapted to control the pulse width modulated signals on the multiple phases in response to the transient event.

5. A power regulator according to claim 1, wherein the ATR system comprises:
   an ATR comparator circuit adapted to:
      monitor the output signal; and
      identify the transient event in the output signal; and
   an ATR control system responsive to the ATR comparator circuit and adapted to:
      generate the asynchronous pulses for controlling the phases of the power regulator in response to the transient event; and
      control a generation, a duration, and a position of the asynchronous pulses to minimize the load voltage excursions.

6. A power regulator for powering a load, comprising:
   an output stage;
   a pulse width modulator connected to the output stage and adapted to control an output signal of the output stage;
   an ATR system connected to the pulse width modulator and comprising a fine resolution pulse width modulator including an interpolator, wherein the ATR system is adapted to:
      monitor the output signal of the output stage;
      identify a transient event in the output signal and adjust the operation of the pulse width modulator by the fine resolution pulse width modulator causing the pulse width modulator to generate asynchronous pulses for controlling the output stage in response to the transient event; and
      control, by the fine resolution pulse width modulator, a generation, a duration, and a position of the asynchronous pulses to minimize load voltage excursions at the output stage.

7. A power regulator according to claim 6, wherein the ATR system is adapted to identify the transient event by comparing a voltage of the output to a plurality of ATR thresholds.

8. A power regulator according to claim 7, wherein the ATR system is adapted to adjust the ATR thresholds according to a state of the load.

9. A power regulator according to claim 6, wherein the ATR system is adapted to generate the asynchronous pulses independently for each phase according to a magnitude of the transient event from a target voltage.

10. A power regulator according to claim 6, wherein the ATR system comprises:
    an ATR comparator circuit adapted to:
       monitor the output signal; and
       identify the transient event in the output signal.

11. In a multiphase power regulator system using pulse width modulation signals to control an output voltage for a load, a method of responding to a transient event in the output voltage, comprising:

detecting a magnitude of the transient event of the output voltage from a target voltage, the transient event corresponding to load voltage excursions at the load;

adjusting operation of a pulse width modulator which generates the pulse width modulation signals on multiple phases, by applying asynchronous pulses to the phases according to the magnitude of the transient event, wherein the asynchronous pulses are generated independently for each phase based on an instantaneous current in each phase or a relative position of the pulse width modulated signals generated by the pulse width modulator on the multiple phases, wherein the asynchronous pulses minimize the load voltage excursions and comprise at least one of:

advanced pulse width modulated pulses in a phase of the pulse width modulation signals;

scaled pulse width modulated pulses in a phase of the pulse width modulation signals; and blanked pulse width modulated pulses in a phase of the pulse width modulation signals.

\* \* \* \* \*